United States Patent Office 3,147,228
Patented Sept. 1, 1964

3,147,228
CRACKING CATALYST DEMETALLIZATION
Henry Erickson, Park Forest, Ill., assignor to Sinclair Research, Inc., New York, N.Y., a corporation of Delaware
No Drawing. Filed Oct. 23, 1963, Ser. No. 318,179
16 Claims. (Cl. 252—412)

This invention concerns the removal of metal poisons from a synthetic gel hydrocarbon conversion catalyst which has been contaminated with one or more poisoning metals by use in the high temperature catalytic conversion of feedstocks containing these metals. The invention may be used as part of an overall metals-removal procedure employing a plurality of processing steps to remove a significant amount of one or more of nickel, vanadium and iron, especially nickel, contained in the poisoned catalyst. The method comprises sulfiding the catalyst to convert the poisoning metals to the sulfide form, oxidizing the catalyst by means of a gaseous oxidizing medium or a liquid aqueous oxidizing medium to provide the poisoning metal in a form dispersible in an aqueous medium and removing the metal contaminant. Copending patent applications Serial Nos. 758,681, filed September 3, 1958 (now abandoned); 763,833 and 763,834, filed September 29, 1958 (now abandoned); 767,794, filed October 17, 1958; 842,618, filed September 28, 1959 (now abandoned); 849,119, filed October 28, 1959 (now abandoned); 19,313, filed April 1, 1960 (now abandoned); 39,810, filed June 30, 1960; 47,598, filed August 4, 1960; 53,380, filed September 1, 1960; 53,623, filed September 2, 1960; 54,532, filed September 7, 1960 (now abandoned); 55,129 and 55,160, filed September 12, 1960; and 55,838, filed September 14, 1960 (now abandoned), describe procedures by which poisoning metals included in a solid oxide hydrocarbon conversion catalyst are removed by subjecting the catalyst, outside the hydrocarbon conversion system, to elevated temperature conditions which put metal contaminants into the chloride, sulfate or other volatile, soluble, dispersible or more available form for removal from the catalyst. This invention is of use in, or in conjunction with such procedures. This application is a continuation-in-part of the above-mentioned applications Serial Nos. 763,834, filed September 29, 1958, now forfeited, 53,380, filed September 1, 1960, now abandoned, 842,618, filed September 28, 1959, now abandoned, and 81,256 and 81,257, filed January 9, 1961, now abandoned.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor, state, and the products of the conversion usually are lower boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting the conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel or gelatinous catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process in which it will be used. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butanes, butylenes and gasoline, based on converting 60 volume percent of cracking feed to lighter materials and coke dropped from 58.5 to 49.6 volume percent when the amount of nickel on the catalyst increased from 55 p.p.m. to 645 p.p.m. and the amount of vanadium increased from 145 p.p.m. to 1480 p.p.m. in a fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discarding the expensive catalyst and enables much lower grade, highly metals-contaminated feedstocks to be used, is now possible. In the process a catalyst contaminated with nickel by use in converting a nickel-containing petroleum feedstock may be treated only for nickel removal, or the catalyst may be treated for vanadium removal as well. Further, the catalyst can be treated primarily for removal of vanadium.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,488,718; 2,488,744; 2,668,798 and 2,693,455, the process of this invention is particularly effective to remove nickel and/or vanadium without endangering the expensive catalyst.

In this invention the hydrocarbon petroleum oils utilized as feedstock for a conversion process may be of any desired type normally utilized in catalytic conversion operations. This feedstock contains nickel, sometimes as much as 0.05% and/or vanadium and usually other metals as well, and the catalyst may be used as a fixed, moving or fluidized bed or may be in a more dispersed state. For typical operations, the catalytic cracking of the hydrocarbon feed would often result in a conversion of about 30 to 80% of the feedstock into lower boiling products. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. Ordinarily, the catalysts are taken from the hydrocarbon conversion system and treated before the poisoning metals have reached an undesirably high level, for instance, about 2%, generally no more than about 1% maximum, content of nickel with or without vanadium. Sulfiding or any other given step in the demetallization treatment is usually continued for a time sufficient to effect a substantial conversion or removal of poisoning metal and ultimately results in a substantial increase in metals removal compared with that which would have been removed if the particular step had not been performed. The actual time or extent of treating depends on various factors and is controlled by the operator according to the situation he faces, e.g. the extent of metals content in the feed, the level of conversion unit tolerance for poison, the sensitivity of the particular catalyst toward a particular phase of the demetallization procedure, etc.

The process of this invention comprises removing a nickel poisoned silica-based catalyst from contact with a nickel contaminated hydrocarbon feedstock in a conversion zone at elevated temperatures and reducing the nickel content of the catalyst by treating it with a sulfiding agent to convert at least a substantial amount of one or both of the poisoning metals to sulfide form, treating the sulfided catalyst with a gaseous oxidizing medium or with a liquid aqueous oxidizing medium and removing the resulting dispersible metal compounds from the catalyst. The process may be repeated for further reductions in metals. The sulfiding step can be performed by contacting the poisoned catalyst with elemental sulfur vapors, or more conveniently by contacting the poisoned catalyst with a volatile sulfide, such as $H_2S$, $CS_2$ or a mercaptan at an elevated temperature generally in the range of about 500–1500° F., preferably about 800 to 1300° F., and a sulfiding vapor partial pressure of about 0.1 to 30 atmospheres or more, preferably about 0.5–25 atmospheres. Hydrogen sulfide is the preferred sulfiding agent. Pressures below atmospheric can be obtained either by using a partial vacuum or by diluting the vapor with gas such as hydrogen or nitrogen. The time of contact varies on the basis of the temperature and pressure chosen and other factors such as the amount of metal to be removed. The sulfiding may run for up to about 20 hours or more, say, about 2–20 hours depending on these conditions and the severity of the poisoning. Temperatures of about 900–1200° F. and pressures approximating 1 atmosphere or less seem near optimum for sulfiding, and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix.

The sulfiding step provides the catalyst with sulfur-containing metal compound and also appears to concentrate some metal poisons, especially nickel, at the surface of the catalyst particle. Poisoning metal sulfide is formed but this sulfide may not necessarily be a simple sulfide of a single metal. Other poisoning metal-sulfur compounds also appear to be formed and some of these compounds may be removed from the catalyst during the sulfiding step particularly when the catalyst contains a high level of both nickel and vanadium. However, good catalyst performance in cracking requires that the metal poisons brought to the catalyst surface in sulfiding be removed by procedures subsequent to the sulfiding. Exposure of the catalyst to oxidation conditions provides the poisoning metal in a form dispersible by an aqueous medium. Sulfidation has been found useful in removing some amount of each of the principal poisoning metals nickel and vanadium from a siliceous base catalyst. Its effectiveness for removing nickel is increased at the upper portions of the temperature range.

Oxidation is performed by a gaseous oxidizing agent to provide metal poison in a dispersible form. Some of the metal contaminant may be converted to the sulfate form. The identity of other soluble or otherwise dispersible forms of the poisoning metals has not been established, but the liquid aqueous medium does remove them. "Dispersible" is intended to include minute particle size material which can pass through an ordinary fritted glass filter, as well as soluble and colloidal size particles. The oxidation preferably takes place immediately after sulfiding, with the catalyst in a substantially anhydrous condition, that is, having no free water, or being at least dry to the touch. Gaseous oxygen or mixture of gaseous oxygen with inert gases such as nitrogen, may be brought into contact with the sulfided catalyst at an oxygen partial pressure of about 0.2 atmosphere and upward and time dependent on oxygen partial pressure. The contacting gas may be at room temperature or above, although usually not above about 1300° F., preferably not above about 1000° F. The actual temperature of contact of the gas with the catalyst, of course, will generally be influenced by the high temperature of the sulfided catalyst when gas contact follows sulfiding immediately. The gas phase oxidation is best carried out at about one atmosphere $O_2$ and at very brief contact times. The oxidizing gas is preferably anhydrous, that is, at ambient temperature, the water would not present a separate liquid phase. Contact with the gaseous oxidizing agent is conveniently maintained for about an hour or longer but apparently the major amount of sulfided material is converted to the dispersible form during the first moments of contact.

The sulfided metal poisons may also be converted to dispersible form by a liquid aqueous oxidation medium such as a dilute hydrogen peroxide or hypochlorous acid water solution. Other oxidizing agents, such as sodium peroxide in acid solution, chromic acid where a small residual $Cr_2O_3$ content in the catalyst is not significant, and similar aqueous oxidizing solutions such as water solutions of manganates and permanganates, chlorites, chlorates and perchlorates, bromites, bromates and perbromates, iodites, iodates and periodates, are also useful. Bromine or iodine water, or aerated, ozonated or oxygenated water, with or without acid, also will provide the poisons in dispersible form. The inclusion in the liquid aqueous oxidizing medium of sulfuric acid or nitric acid has been found greatly to reduce the consumption of peroxide. In addition the inclusion of nitric acid in the oxidizing solution provides for increased vanadium removal. Useful proportions of acid to peroxide to catalyst generally include about 10 to 25 lbs. acid (on a 100% basis) to about 1 to 30 or more lbs. $H_2O_2$ (also on a 100% basis) in a very dilute aqueous solution, to about one ton of catalyst. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

The use of a water solution of chlorine as an oxidizing medium shows good results in the removal of nickel from the catalyst, especially when chlorine gas is added to the slurry of catalyst in chlorine water during the oxidation treatment, although some loss of $Al_2O_3$ also occurs. A 30% $H_2O_2$ solution in water seems to be a commercially advantageous raw material for preparing the aqueous oxidizing solution. Sodium peroxide or potassium peroxide may be used in place of hydrogen peroxide, and in such circumstances, extra sulfuric or nitric acid are usually provided.

Another highly advantageous oxidizing medium, especially where the catalyst, before sulfiding, has been given a high temperature treatment with molecular oxygen-containing gas, is an aerated dilute nitric acid solution in water. Such a solution may be provided by continuously bubbling air into a slurry of the catalyst in very dilute nitric acid. Other oxygen-containing gases may be substituted for air. The time required for oxidation is generally at least about 7 to 8 minutes. The oxidation slurry may contain, for instance, about 20% solids and provide about five or ten pounds of nitric acid per ton of catalyst depending on the pH of the water used to make up the medium. Studies have shown a greater concentration of $HNO_3$ to be of no significant advantage.

After providing the poisoning metal, especially nickel, in a dispersible form, the catalyst can be washed with a liquid aqueous medium to remove metal compound. This aqueous medium, for best removal of nickel, is generally somewhat acidic. Frequently, however, it is desirable to add small amounts of a mineral acid to the wash water especially where untreated water is employed. Useable acids include sulfuric, nitric and hydrochloric. Ambient temperatures can be used in the wash but temperatures of about 150° F. to the boiling point of water and agitation are helpful in increasing dispersibility. Pressures above atmospheric may be used but the results usually do not justify the additional equipment. Again, short contact times from about two minutes to half an hour are sufficient for poisoning metal removal and the aqueous oxidizing solution, if employed, may perform part or all of the metal compound removal simultaneously with the oxidation.

Sulfiding is employed with particular advantage when it is desired to remove primarily nickel poisons from the used hydrocarbon conversion catalyst. In addition, these procedures serve to remove some vanadium. Before any high temperature procedures are employed, subjecting the poisoned catalyst sample to magnetic flux may be found desirable to remove any tramp iron particles which may have become mixed with the catalyst, particularly when peroxide or hypochlorite oxidation is to be employed. Vanadium poison removal can be increased when, after the slightly acid aqueous wash for removal of nickel and other metals subsequent to oxidation or other treatment of the sulfided catalyst, the catalyst is washed with a basic aqueous solution, containing, for instance, ammonium ions as described in copending application Serial No. 39,810. Even greater vanadium removal is obtained when, upon removal of the poisoned catalyst from the conversion system, it is regenerated and given a treatment at elevated temperatures with a molecular oxygen-containing gas prior to sulfiding and other treatments. This oxygen treatment also improves nickel removal when an aerated nitric acid medium is used after sulfidation.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about three to ten minutes and the oxygen content of the effluent gases from the regenerator is desirably less than about ½%. When later oxygen treatment is employed, the regeneration of any particular quantum of catalyst is generally regulated to give a carbon content of less than about 0.5%.

Treatment of the regenerated catalyst with molecular oxygen-containing gas is described in copending application Serial No. 19,313. The temperature of this treatment is generally in the range of about 1000 to 1800° F. and preferably at least about 50° F. higher than the regeneration temperature but below a temperature where the catalyst undergoes any substantial deleterious change in its physical or chemical characteristics. The catalyst is, as pointed out, in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least lyong enough to stabilize a substantial amount of vanadium in its highest valence state, as evidenced by a significant increase, say at least about 10%, preferably at least about 100%, in the vanadium removed in subsequent stages of the process. This increase is over and above that which would have been obtained by the other metals removal steps without the oxygen treatment.

The treatment of a vanadium-poisoned catalyst with molecular oxygen-containing gas prior to sulfiding is preferably performed at a temperature of about 1150 to 1350 or even as high as 1600° F. and usually is at least about 50° F. higher than the regeneration temperature. Little or no effect on vanadium removal is accomplished by treatment at temperatures significantly below about 1000° F., even for an extended time. The upper temperature, to avoid undue catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment, say, a quarter of an hour, to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness was observed after about four hours of treatment.

The oxygen-containing gas used in the treatment contains molecular oxygen as the essential active ingredient. The gas may be oxygen, or a mixture of inert gas with oxygen, such as air or oxygen-enriched air. The partial pressure of oxygen in the treating gas may range widely, for example, from about 0.1 to 30 atmospheres, but usually the total gas pressure will not exceed and generally be far below about 25 atmospheres. As the oxygen partial pressure increases the time needed to increase the valence of a given amount of vanadium in general decreases. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen.

As previously stated, vanadium may be removed from the catalyst by washing it with a basic aqueous solution. The pH is frequently greater than about 7.5 and the solution preferably contains ammonium ions. The solution should be substantially free, before contact with the catalyst, of any contaminant materials which would remain deposited on the catalyst returned to the hydrocarbon conversion system. The ammonium ions may be $NH_4^+$ ions or organic-substituted $NH_4^+$ ions such as methyl ammonium and quaternary hydrocarbon radical ammoniums. The aqueous wash solution can be prepared by addition of a dry reagent or a concentrated solution of the reagent to water. Ammonia or methylamine gas may be dissolved directly in water. An aqueous solution of $NH_4OH$ is highly preferred, the preferred solutions having a pH of about 8 to 11.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about 1 minute, are satisfactory, while the time of washing may last 2 to 5 hours or longer. The mechanism of the ammonium washing step may be one of simultaneous conversion of vanadium to salt form and removal by the aqueous ammonium wash but is not to be limited by such a theory.

Since a slightly acidic solution is desirable for nickel removal, the acidic aqueous wash preferably takes place before the ammonium wash. After the latter of these washes, the catalyst slurry can be filtered to give a cake which may be reslurried with water or rinsed in other ways, such as, for example, by a water wash on the filter, and the rinsing may be repeated, if desired, several times. A repetition of the ammonium wash without other treatments seems to have little effect on vanadium removal if the first washing has been properly conducted. However, repetition of the basic aqueous ammonium wash after, for example, a repeated high-temperature oxygen treatment does serve to further diminish the vanadium content of the catalyst.

After the final treatment which may be used in the catalyst demetallization procedure, the catalyst is conducted to a hydrocarbon conversion system, for instance, to the catalyst regenerator. The catalyst may be returned as a slurry in the final aqueous wash medium, or it may be desirable first to dry the catalyst filter cake or filter cake slurry at, say, about 250 to 450° F. and also, prior to reusing the catalyst in the conversion operation it can be calcined, say at temperatures usually in the range of about 700 to 1300° F. A fluidized solids technique is recommended for the sulfiding and other vapor contact processes used in any selected demetallization procedure as a way to shorten the time requirements. Also, further metals content frequently may be removed by repeated or other treatments. Inert gases frequently may be employed after contact with reactive vapors to remove any of these vapors entrained in the catalyst or to purge the catalyst of reaction products.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 100 or preferably about 250 p.p.m. nickel will be accumulated on the catalyst before demetallization is warranted. The treatment of this invention is effective despite the presence of a small amount of carbon on the treated catalyst, but preferably the regeneration is continued until the catalyst contains not more than about 0.5% carbon before a subsequent oxygen treatment. Where the catalyst is subjected to the oxygen treatment before it is substantially carbon free the length of oxygen treatment, as recited above, is reckoned from the time that the catalyst reaches the substantially carbon free state, that is the state where little, if any, carbon is burned even when the catalyst is contacted with oxygen at temperatures conducive to combustion.

The amount of Ni or V removed in practicing the procedures outlined or the proportions of each which are removed may be varied by proper choice of treating conditions. It may prove necessary, in the case of very severely poisoned catalysts, to repeat the treatment to reduce the metals to an acceptable level, perhaps with variations when one metal is greatly in excess. A further significant advantage of the process lies in the fact that the overall metals removal operation, even if repeated, does not unduly deleteriously affect the activity, selectivity, pore structure and other desirable characteristics of the catalyst. Any given step in the demetallization treatment is usually continued for a time sufficient to effect a substantial conversion or removal of poisoning metal and ultimately results in a substantial increase in metals removal compared with that which would have been removed if the particular step had not been performed.

In practice the process could be applied in a refinery by removing a portion of catalyst from the regenerator or regenerator standpipe of the cracking system after a standard regeneration treatment to remove a good part of the carbon, heating this portion of the catalyst inventory in air to the temperature and for the length of time found to be sufficient for vanadium removal without catalyst damage, sufiding and oxidizing the catalyst and slurrying it, in water for the slightly acid wash, filtering, and reslurrying the catalyst in the ammonium ion-containing solution. The treated catalyst can be returned to the unit, for example, to the regenerator. The following examples are illustrative of the invention but should not be considered limiting.

EXAMPLE I

A 15 g. sample of base catalyst P, a synthetic gel 75% silica–25% alumina fluid type cracking catalyst poisoned to 726 p.p.m. NiO and 2510 p.p.m. $V_2O_5$ and 0.364% Fe by use in a pilot plant operation cracking a petroleum gas oil hydrocarbon stock containing tramp iron as well as nickel, vanadium and iron naturally present in the feedstock was removed from the hydrocarbon conversion operation and treated, in a fluidized bed, with an equimolar mixture of $N_2$ and $H_2S$ for 3 hours at 1050° F. The catalyst was cooled in nitrogen and heated, in about one-half hour, to 900° F. in a stream of oxygen. On reaching 900° F. the catalyst was immediately cooled, in $O_2$, to room temperature. The oxidized catalyst was washed 3 times by heating to boiling as a water slurry, filtering, and rinsing with cold water between the boiling water treatments. The first filtrate contained much $SO_4$, considerable Ni and V, and traces of Fe. The second filtrate showed traces of Ni and $SO_4$. The third filtrate contained no metals or $SO_4$. Analysis showed reductions of 51% in NiO, 4% in $V_2O_5$ and 3% in Fe.

EXAMPLE II

A sample of base catalyst P was treated, in the manner of Example I, with $H_2S$ for 6 hours at 900° F. The sulfided catalyst was oxidized and washed in the manner of Example I. Analysis showed reductions of 15% in NiO, 20% in $V_2O_5$ and 16% in Fe.

EXAMPLE III

Another sample of catalyst P was treated with $H_2S$ at 310 p.s.i.g. for 16 hrs. at 730° F. in a Pyrex-lined rocker-bomb. The sulfided catalyst was treated, in a fluidized bed, with oxygen for one hour at room temperature. The oxidized catalyst was leached in the manner of Example I. Analysis showed reductions of 9.8% in NiO, 23% in $V_2O_5$ and 5% in Fe.

EXAMPLE IV

Another sample of catalyst P, sulfided in the manner of Example III, was treated with oxygen for 24 hrs. at room temperature, in a fluidized bed. The oxidized catalyst was leached in the manner of Example I. Analysis showed reductions of 7% in NiO, 19% in $V_2O_5$ and 8% in Fe.

EXAMPLE V

Another sample of catalyst P, sulfided in the manner of Example III was oxidized and leached in the manner of Example I. Analysis showed reductions of 50% in NiO, 19% in $V_2O_5$ and 10% in Fe.

EXAMPLE VI

Another sample of catalyst P, sufided in the manner of Example III was treated with oxygen for one hour at 900° F. in a fluidized bed, and leached in the manner of Example I. Analysis showed reductions of 40% in NiO, 14% in $V_2O_5$ and no reduction in Fe.

EXAMPLE VII

Another sample of catalyst P, sulfided in the manner of Example III, was treated with oxygen for one hour at 750° F. in a fluidized bed, and leached in the manner of Example I. Analysis showed reductions in NiO of 36%, in $V_2O_5$ of 12% and a small reduction in Fe.

EXAMPLE VIII

Another sample of catalyst P, sulfided in the manner of Example III, was treated with oxygen for one hour at 500° F. in a fluidized bed, and leached in the manner of Example I. Analysis showed reductions of 22% in NiO, 22% in $V_2O_5$ and 19% in Fe.

EXAMPLE IX

Another sample of catalyst P, sulfided in the manner of Example II, was oxidized in the manner of Example I, using air in place of oxygen. The oxidized catalyst was leached in the manner of Example I, resulting in reductions of 37% in NiO, 17% in $V_2O_5$ and a slight reduction in Fe.

EXAMPLE X

Another sample of catalyst P, sulfided in the manner of Example III, was treated with air for 3 hrs. at 900° F. in a fluidized bed, and leached in the manner of Example I. Analysis showed reductions of 9.1% in NiO, 4.6% in $V_2O_5$ and 3.8% in Fe.

EXAMPLE XI

The catalyst resulting from the run of Example X was retreated with $H_2S$ for 3 hrs. at 900° F. in a fluidized bed. The sulfided catalyst was oxidized with air in the manner of Example X, and leached with boiling water. Analysis showed reductions of 58% in NiO, 12.2% in $V_2O_5$ and 11.5% in Fe, based on the partially treated catalyst of Example X. Based on metals content of the original catalyst the reductions were 61.6% in NiO, 16.7% in $V_2O_5$ and 11.8% in Fe.

EXAMPLE XII

Base catalyst M, another synthetic silica-alumina fluid type cracking catalyst, containing 292 p.p.m. NiO and 2380 p.p.m. $V_2O_5$ due to use in cracking a nickel- and vanadium-containing liquid petroleum gas oil hydrocarbon stock, was treated with an equimolar mixture of nitrogen and hydrogen sulfide for 3 hrs. at 900° F. The sulfided catalyst was heated to 1050° F. in $O_2$ in a fluidized bed, and immediately cooled. The oxidized catalyst was leached in the manner of Example I. Analysis showed reductions of 19% in NiO, 16% in Fe and no reduction in $V_2O_5$.

EXAMPLE XIII

Another sample of catalyst M was sulfided in the manner of Example XII and then oxidized in the same manner but at 900° F. Analysis showed reductions of 35% in NiO, 6% in $V_2O_5$ and 29% in Fe.

EXAMPLE XIV

Another sample of catalyst M was sulfided and oxidized in the manner of Example XII except that the latter step was performed at 750° F. Reductions were 11% in NiO, 6% in $V_2O_5$ and 11% in Fe.

EXAMPLE XV

Another sample of catalyst M was treated in the manner of Example XII except that it was oxidized at 500° F. Reductions were 9.5% in $V_2O_5$, 7% in Fe and no reduction in NiO.

Analytical data on the results of the use of sulfiding and gaseous oxidation are given in Table I.

about 1050° F. After this treatment the sample was slurried in an aqueous solution containing $H_2SO_4$ in the amount of 5 lbs. $H_2SO_4$ per ton of catalyst, removed from the slurry and dried. The dried sample was analyzed for poisoning metals content, but, since no more than traces of alumina were found in the slurry filtrate no analyses for $Al_2O_3$ content were performed on sample 5299. The results of the treatments, given below in Table II, show that merely acid-washing a catalyst, exposed in hydrocarbon conversion to a sulfur-containing feedstock, is not effective for removal of nickel. In removing vanadium, such treatment also removes a large amount of the essential alumina component of the catalyst.

*Table I*

| Catalyst of Example— | Sulfiding conditions | | | | Oxidation | | | Analysis | | |
|---|---|---|---|---|---|---|---|---|---|---|
| | P.s.i.g. | Gas | Time, hrs. | Temp., ° F. | Gas | Time, hrs. | Temp., ° F. | P.p.m. NiO | P.p.m. $V_2O_5$ | Percent Fe |
| Untreated | | | | | | | | 726 | 2,510 | .364 |
| I | Atm. | $N_2/H_2S$ | 3 | 1050 | $O_2$ | | 900 | 356 | 1,275 | .353 |
| II | Atm. | $H_2S$ | 6 | 900 | $O_2$ | | 900 | 615 | 2,005 | .306 |
| III | 310 | $H_2S$ | 16 | 730 | $O_2$ | 1 | 75 | 655 | 1,920 | .345 |
| IV | 310 | $H_2S$ | 16 | 730 | $O_2$ | 24 | 75 | 674 | 2,082 | .336 |
| V | 310 | $H_2S$ | 16 | 730 | $O_2$ | | 900 | 367 | 2,041 | .327 |
| VI | 310 | $H_2S$ | 16 | 730 | $O_2$ | 1 | 900 | 436 | 2,150 | .372 |
| VII | 310 | $H_2S$ | 16 | 730 | $O_2$ | 1 | 750 | 467 | 2,210 | .352 |
| VIII | 310 | $H_2S$ | 16 | 730 | $O_2$ | 1 | 500 | 570 | 1,945 | .294 |
| IX | 310 | $H_2S$ | 16 | 730 | Air | | 900 | 455 | 2,078 | .346 |
| X | 310 | $H_2S$ | 16 | 730 | ...do... | 3 | 900 | 660 | 2,395 | .350 |
| XI | Atm. | $H_2S$ | 3 | 900 | ...do... | 3 | 900 | 278 | 2,090 | .321 |
| Untreated | | | | | | | | 292 | 2,381 | .415 |
| XII | Atm. | $N_2/H_2S$ | 3 | 900 | $O_2$ | | 1,050 | 236 | 2,458 | .347 |
| XIII | Atm. | $N_2/H_2S$ | 3 | 900 | $O_2$ | | 900 | 190 | 2,250 | .296 |
| XIV | Atm. | $N_2/H_2S$ | 3 | 900 | $O_2$ | | 750 | 259 | 2,230 | .370 |
| XV | Atm. | $N_2/H_2S$ | 3 | 900 | $O_2$ | | 500 | 289 | 2,155 | .385 |

EXAMPLES XVI TO XX

Although it has been reported in U.S. Patent 2,494,556 that certain metal poisons on a catalyst may be removed when the catalyst is given a dilute mineral acid treatment following its use in conversion of a hydrocarbon charge stock containing more than 1½% sulfur, the following examples show this treatment to be ineffective for the removal of nickel.

Batches of regenerated catalyst were obtained which had been poisoned with metal contaminants from use in a commercial catalytic cracking unit using conventional fluidized catalyst techniques, including cracking and air regeneration at about 1100° F., to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. The base catalyst was a synthetic gel type cracking catalyst containing a nominal 25% $Al_2O_3$, the balance silica.

A batch of this base catalyst L removed at one time from this commercial unit after regeneration, was divided into samples 5112, 5114 and 5115. Another batch of this poisoned catalyst (base K), removed at another time from the same commercial unit after regeneration, was divided into samples 14,148 and 5299. Samples 5112 and 14,148 were analyzed for metals content without further treatment. Samples 5114 and 5115, to test the effectiveness of the process described in the above-mentioned patent, were each washed with an aqueous solution containing 10% HCl, sample 5114 being in contact with the solution for 2 minutes and sample 5115 for one hour.

Sample 5299 was treated with $H_2S$ for one hour at 1175° F. and was then held in oxygen for 10 minutes at

*Table II*

| Sample | 5,112 | 5,114 | 5,115 | 14,148 | 5,299 |
|---|---|---|---|---|---|
| Treatment of regenerated catalyst: | | | | | |
| Oxygen | No | No | No | No | No |
| Sulfiding (out of contact with feed) | No | No | No | No | Yes |
| Oxidation | No | No | No | No | Yes |
| Washing | No | Yes | Yes | No | Yes |
| Analysis: | | | | | |
| Fe (p.p.m.) | 2,690 | 2,515 | 2,145 | 2,730 | 2,595 |
| NiO (p.p.m.) | 306 | 307 | 303 | 326 | 208 |
| $V_2O_5$ (p.p.m.) | 3,759 | 3,402 | 2,814 | 4,438 | 4,470 |
| Percent $Al_2O_3$ | 26.1 | 26.0 | 21.4 | 24.6 | |
| Metals removal: | | | | | |
| Percent Fe | | 6.5 | 20.2 | | 5 |
| Percent NiO | | | | | 32.2 |
| Percent $V_2O_5$ | | 9.7 | 25.1 | | |
| Percent $Al_2O_3$ | | 0.04 | 18.0 | | |

EXAMPLES XXII TO XXXII

The data summarized in Table III was obtained from a series of runs performed upon base catalyst J which was similar in composition to catalyst K and had been poisoned in the same manner. This catalyst was divided into 12 samples, one of which was analyzed without any demetallization treatment and then used to test-crack a petroleum hydrocarbon East Texas gas oil fraction (feedstock B) having the following approximate characteristics:

| | |
|---|---|
| IBP (° F.) | 490–510 |
| 10% | 530–550 |
| 50% | 580–600 |
| 90% | 650–670 |
| EP | 690–710 |
| Gravity (API) | 33–35° |
| Viscosity (SUS at 100° F.) | 40–45 |
| Aniline point ° F. | 170–175 |
| Pour point ° F. | 35–40 |
| Sulfur percent | 0.3 |

The results of this cracking are given in Table III below.

The rest of the catalyst was treated with air for one hour at 1300° F. and then exposed to $H_2S$ vapors for one hour at 1175° F. The samples, except sample XXXII, were exposed to contact with dry air at the temperatures and for the time periods given in Table III and washed with tap water containing the additives shown in the table.

In washing procedure C the oxidized catalyst was placed in a fritted glass funnel, mixed with deionized water to form a slurry having 20% solids and filtered in 30 seconds. The resulting cake was rinsed and reslurried in deionized water containing about 0.15 weight percent $HNO_3$ based on the weight of catalyst, and rinsed again in the funnel. The cake was reslurried in a flask to 20% solids content in ammonia water containing 0.5 weight percent $NH_3$ based on the catalyst. The catalyst was held in this slurry for 10 minutes at 160° F., filtered and rinsed in the funnel, and dried. Wash procedure D was exactly the same as C except the slurries formed had 5% solids. In wash procedures F and G no ammonia treatment was employed and in procedure F no $HNO_3$ was added to the rinse water. Otherwise these procedures were similar to procedure C. After drying, a portion of each sample was sent to metals analysis while the remaining portion was used for test cracking feedstock B.

It can be seen from the data given in Table III that greatly improved nickel removal is obtained by exposure of the catalyst to an oxidizing gas after sulfiding. Sample XXXII, which was not exposed to air after sulfiding, was not demetallized to the extent of the other catalyst samples. Further, although sample XXXII showed a greatly improved relative activity, the high gas and coke factors show that an undesirably high amount of this activity goes into gas and coke production.

in Fe. The beginning and final analyses are given in Table IV.

EXAMPLE XXXIV

A 15 g. sample of 400–5010 treated with 310 p.s.i.g. $H_2S$ for 16 hours at 730° F. was treated with chlorine-water in the manner of Example XXXIII. Analysis showed a 39% reduction in NiO, 68% in $V_2O_5$ and 43% in Fe. (See Table IV.)

EXAMPLE XXXV

A 15 g. sample of 400–5010, sulfided in the manner of Example XXXIV, was slurried for one hour at room temperature in a solution of 75 ml. $H_2O$ and 10 ml. 30% $H_2O_2$. The washed product was treated again with the aqueous medium in the same manner. The first filtrate contained Ni, V and $SO_4$, the second was free of metals but contained a trace of $SO_4$. Thus the second leaching was superfluous. Analysis showed a reduction in NiO of 36%, in $V_2O_5$ of 70% and no reduction in iron.

EXAMPLE XXXVI

A 65 g. sample of 400–5010 was sulfided in the manner of Example XXXIV and contacted with a solution of 400 ml. $H_2O$ and 6½ ml. 30% $H_2O_2$. Analysis showed reductions of 28% in NiO, 67% in $V_2O_5$ and no reduction in iron.

EXAMPLE XXXVII

A 15 g. sample of 400–5010 was sulfided as in Example XXXIV and subjected to a 75 ml. $H_2O$ and 0.8 ml. 3% $H_2O_2$ solution. Analysis showed reductions in NiO of 28%, in $V_2O_5$ of 30% and a small reduction (7%) in iron.

*Table III*

| | Base J | XXII | XXIII | XXIV | XXV | XXVI | XXVII | XXVIII | XXIX | XXX | XXXI | XXXII |
|---|---|---|---|---|---|---|---|---|---|---|---|---|
| Dry air contact | | Yes | Yes | Yes | Yes | Yes | Yes | Yes | Yes | Yes | Yes | No |
| °F | | 75 | 75 | 75 | 75 | 75 | 75 | 75 | 250 | 1,050 | 75 | |
| Time | | 24 hrs | 24 hrs | 24 hrs | 24 hrs | 24 hrs | 24 hrs | 47 hrs | 1 hr | 3 hrs | 1 min | |
| Wash: | | | | | | | | | 1 hr | | | |
| Temp., °F | | 210 | 210 | 210 | 210 | 210 | 80 | 210 | 210 | 210 | 210 | 210 |
| Time, hrs | | 1/4 | 1 | 2 | 1 | 1 | 1 | 1 | 1 | 1 | 1 | 1 |
| Additive | | $HNO_3$ | $HNO_3$ | $NH_3$ | HCl | None | $HNO_3$ | $HNO_3$ | $HNO_3$ | $HNO_3$ | $HNO_3$ | $HNO_3$ |
| Add. conc., wt. percent | | .5 | 1.25 | .5 | .13 | | .25 | .5 | .5 | .5 | .5 | .5 |
| Washing procedure | | C | D | C | C | F | G | C | C | C | C | C |
| P.p.m. NiO | 307 | 133 | 104 | 136 | 130 | 159 | 169 | 120 | 157 | 152 | 135 | 185 |
| P.p.m. $V_2O_5$ | 3,723 | 2,829 | 2,648 | 2,703 | 2,685 | 3,138 | 3,220 | 2,957 | 2,984 | 2,839 | 2,965 | 2,975 |
| Percent Fe | .296 | .225 | .200 | .229 | .189 | .259 | .241 | .176 | .198 | .241 | .203 | .215 |
| Test Cracking: | | | | | | | | | | | | |
| Relative activity | 36.5 | 46.6 | 43.5 | 43.4 | 47.0 | | | 44.8 | 41.2 | 41.7 | 42.5 | 47.0 |
| Dist. plus loss | 34.0 | 38.5 | 37.4 | 37.4 | 39.0 | | | 38.0 | 36.3 | 36.6 | 37.0 | 38.9 |
| Gas factor | 1.46 | 1.30 | 1.22 | 1.29 | 1.27 | | | 1.59 | 1.30 | 1.37 | 1.27 | 1.37 |
| Coke factor | 1.18 | 1.06 | 0.95 | 1.07 | 1.03 | | | 1.07 | 1.13 | 1.18 | 1.03 | 1.15 |
| Gas gravity | 1.15 | 1.23 | 1.30 | 1.22 | 1.25 | | | 1.25 | 1.21 | 1.18 | 1.24 | 1.20 |

EXAMPLE XXXIII

A "Nalcat" synthetic gel 75% silica-25% alumina fluid-type cracking catalyst was used in a pilot plant operation for the cracking conversion of a petroleum gas oil hydrocarbon stock to gasoline. The feedstock contained naturally-occurring nickel, vanadium and iron compounds as well as tramp iron. The conversion was conducted at about 910° F. and nominally atmospheric pressure. When the poisoning level had reached 726 p.p.m. NiO and 2510 p.p.m. $V_2O_5$, the catalyst, denoted as 400–5010, was removed from the cracking zone after regeneration.

A 15 g. sample of 400–5010, was slurried ½ hour, at room temperature, in 75 ml. of water saturated with chlorine and then filtered and washed. The filtrate contained Al, $SO_4$, and V. Analysis showed no effect on NiO, a 30% reduction in $V_2O_5$ and a small (10%) reduction

EXAMPLE XXXVIII 15 g. of 400–5010 sulfided in the manner of Example XXXIV were slurried one hour at 180–212° F. in 75 ml. of a solution containing 0.43 ml. 6 N $H_2SO_4$ and 2.5 ml. 3% $H_2O_2$, filtered and washed. Analysis showed reductions in NiO of 43%, in $V_2O_5$ of 42% and Fe of 24%.

EXAMPLE XXXIX 15 g. 400–5010 were treated 6 hours at 900° F. with $H_2S$ at atmospheric pressure and leached with $H_2SO_4$/$H_2O_2$ solution in the manner of Example XXXVIII. Analysis showed reductions in NiO of 43%, in $V_2O_5$ of 65% and in Fe of 33%.

EXAMPLE XL 15 g. 400–5010 were treated 3 hours at 1050° F. with equimolar $N_2$/$H_2S$ (½ atm. $H_2S$) and leached in the manner of Example XXXVIII. Analysis showed reductions in NiO of 58%, in $V_2O_5$ of 23% and Fe of 44%.

Table IV
METALS REMOVED FROM POISONED-SYNTHETIC CRACKING CATALYSTS

| Sample of Example— | Sulfiding conditions | | | | Oxidation | | | | Analyses | | |
|---|---|---|---|---|---|---|---|---|---|---|---|
| | P.s.i.g. | Gas | Time, hrs. | Temp., °F. | Lbs. H₂O₂/ ton cat. | Lbs. H₂SO₄/ ton cat. | Dilution (Molarity) | | P.p.m. NiO | P.p.m. V₂O₅ | Percent Fe |
| | | | | | | | H₂O₂ | H₂SO₄ | | | |
| Untreated | | | | | | | | | 726 | 2,510 | .364 |
| XXXIII | | | | | leached with H₂O/Cl₂ | | | | 740 | 1,765 | .327 |
| XXXIV | 310 | H₂S | 16 | 730 | leached with H₂O/Cl₂ | | | | 440 | 815 | .207 |
| XXXV | 310 | H₂S | 16 | 730 | 222.4 | None | 1.31 | | 446 | 765 | .376 |
| XXXVI | 310 | H₂S | 16 | 730 | 33.33 | None | 0.085 | | 523 | 840 | .369 |
| XXXVII | 310 | H₂S | 16 | 730 | 1.6 | None | .0094 | | 555 | 760 | .338 |
| XXXVIII | 310 | H₂S | 16 | 730 | 1.0 | 16.8 | .029 | .017 | 417 | 1,461 | .278 |
| XXXIX | Atm. | H₂S | 6 | 900 | 1.0 | 16.8 | .029 | .017 | 413 | 875 | .244 |
| XL | Atm. | H₂/H₂S | 3 | 1,050 | 1.0 | 16.8 | .029 | .017 | 351 | 1,925 | .204 |

It will be observed that negligible reductions in poison constituents are obtained when oxidation is performed without prior sulfiding (see Example XXXIII). It is apparent from these data that the ratio of removal of NiO vis V₂O₅ may be varied by proper choice of treatment. This is valuable in cases where one metal is present in great excess.

EXAMPLE XLI

A 60 g. sample of 400–5010 was sulfided as in Example XXXIV and treated at room temperature with a solution containing 2.29 g. Na₂O₂, 3.47 g. H₂SO₄ and 400 cc. water. After water washing the catalyst contained 388 p.p.m. Ni, a reduction of 41.5%, 1915 p.p.m. V, a reduction of 21.7% and .234% Fe, a reduction of 35.7%.

EXAMPLE XLII

A virgin, calcined "Nalcat" synthetic gel catalyst (5366) composed of 25% Al₂O₃, substantially the rest SiO₂, is used in a test cracking process to crack feedstock B used in Examples XXII to XXXII. The results of this cracking are given in Table V. This catalyst was used in a commercial catalytic cracking conversion unit, using conventional fluidized catalyst techniques, including cracking and air regeneration to convert feedstock A described above in Examples XVI to XXI. When this catalyst had the poisoning metals content reported in Table V, for Sample 5461, it was removed from the cracking system after regeneration. This catalyst Sample 5461 gave the results reported in Table V when used to test-crack feedstock B. After a treatment by magnetic flux, this catalyst sample was reduced in iron content to 3965 p.p.m. and was denominated Sample 5319. This sample was subjected to the action of H₂S gas for four hours at 1050° F. and then slurried for 60 minutes in an aqueous solution having a pH of about 3–4 and containing 25.7 lbs. HNO₃ and 40 lbs. H₂O₂ per ton of catalyst. The slurry contained 20% solids and had a temperature of 212° F. This sample (5331) had the metals content reported in Table V. The percentage figures reported for metals removal from this sample are based on the metals content of Sample 5319. After drying and calcination for 2½ hrs. at about 1050° F. a portion of this sample was steamed-stabilized at 1150° F. for 6 hrs. and was used for test cracking of feedstock B with the results reported in Table V.

The other portion of 5331 was again subjected to the same sulfiding, oxidizing and calcination steps as before. A sample, 5335, of this portion had the characteristics and cracking effects on feedstock B reported in Table V. The rest of this portion was given a third sulfiding, oxidizing and calcination treatment. This was Sample 5346, part of which was used in cracking feedstock B and part of which was given a fourth demetallization treatment as above (Sample 5359). Sample 5451 was a portion of 5359 which was calcined in air for 24 hrs. before being used in the cracking process on feedstock B.

Table V

| Sample | Metals content (p.p.m.) | | | Percent metals removed chemically | | | Cracking activity | | | | | | | | | |
|---|---|---|---|---|---|---|---|---|---|---|---|---|---|---|---|---|
| | Fe | NiO | V₂O₅ | Fe | NiO¹ | V₂O₅¹ | Percent gaso. | Percent gas | Percent coke | Percent conv. | Gas Grav. | R.A. | D+L | G.F. | C.F. | H.P.F. |
| 5366 | | | | | | | 27.7 | 19.5 | 2.9 | 50.1 | 1.47 | 54.5 | 41.9 | 1.00 | 0.75 | 38 |
| 5461² | 4,888 | 332 | 43,66 | | | | 20.7 | 12.6 | 2.8 | 36.1 | 0.96 | 26.4 | 28.0 | 1.89 | 1.57 | 291 |
| 5331³ | 2,920 | 161 | 4,160 | 26.4 | 55.6 | 8.7 | 20.6 | 12.5 | 3.4 | 36.5 | 0.87 | 27.1 | 28.5 | 2.04 | 1.85 | 303 |
| 5335⁴ | 2,745 | 111 | 3,400 | 30.8 | 69.4 | 24.6 | 25.1 | 12.7 | 3.1 | 40.9 | 1.22 | 35.0 | 33.2 | 1.18 | 1.30 | 121 |
| 5346⁵ | 1,980 | 105 | ⁶ 2,475 | 50.0 | 71.1 | 45.0 | 23.7 | 12.6 | 3.2 | 39.5 | 1.14 | 32.8 | 32.1 | 1.35 | 1.45 | 150 |
| 5359⁷ | 1,765 | 89 | 2,575 | 55.5 | 75.5 | 43.0 | 23.7 | 13.5 | 2.4 | 39.6 | 1.20 | 33.0 | 32.2 | 1.37 | 1.09 | 1.49 |
| 5451⁸ | 1,765 | 89 | 2,575 | 55.5 | 75.5 | 43.0 | 25.3 | 18.9 | 4.0 | 48.2 | 1.23 | 50.5 | 40.4 | 1.25 | 1.13 | |

¹ The relative contents of NiO and V₂O₅ analyzed higher after the poisoned catalyst was magnetically treated.
² No treatment.
³ One demetallization treatment.
⁴ Two demetallization treatments.
⁵ Three demetallization treatments.
⁶ Estimated.
⁷ Four demetallization treatments.
⁸ Extra calcination.

As shown in Table V the effect of metals poisoning on coke, gas and hydrogen yields is quite marked. In considering the data of Tables IV and V it should be noted that at these metal contents the treated catalyst is still poisoned to the extents indicated. Further reducion in metals, where possible by more refined processing or by repeated treatment, frequently improves both activity and product distribution. Also, it will be noted that the effect of the treatment process of this invention is particularly marked in the case of a synthetic gel catalyst, producing catalysts which have been freed of as much as 75% of their content of poisoning metals and which catalysts have cracking characteristics approaching those of virgin unpoisoned catalyst.

EXAMPLE XLIII

This example employs sulfidation with an ammonium wash for vanadium removal. Batches of a base poisoned catalyst which had a composition similar to catalyst 5461 and had been poisoned in cracking feedstock A to the metals content reported in Table VI were air treated for 4 hours at 1300° F., and sulfided for 2 hours with H₂S at 1200° F., except for Sample 43 which was not air treated and was sulfided with H₂S at 1150° F. for ½ hour. The batches were divided into a number of samples which were treated as a 20% solids slurry with various aqueous nitric acid solutions through which oxidizing gas was bubbled as reported in Table VI.

In procedure A the slurry was held for the time reported in the table in a vessel fitted with a fritted glass air dispersion disc in its bottom. This disc was also used as a filter, and the oxidation liquid was drawn out through it by vacuum. Filtration time was 5–15 minutes for 400 ml. of liquid. Filtration was followed by reslurrying the cake in deionized water with another filtration. The cake was then reslurried to a 20% solids content in an aqueous ammonia solution containing 0.5 weight percent $NH_3$ based on the weight of the catalyst. The catalyst was held in this slurry for 10 minutes at 160° F., then filtered and dried.

In procedure B the oxidation slurry was transferred to a fritted glass funnel and filtered in 30 seconds, then washed by alternate rinsing and re-slurrying of the cake in the funnel. Ammonia wash was carried out in a flask, and the slurry then transferred to the funnel and washed in the same manner.

Procedure C was the same as B, except the wash water after oxidation and before ammonia leach was acidified with .15 weight percent $HNO_3$ based on the catalyst weight.

After the final wash each sample was dried and a portion analyzed for poisoning metal content. The remainder of each sample was sent to test cracking of feedstock B.

in nickel removal by the aqueous medium brought about by preliminary treatment of the catalyst with molecular oxygen-containing gas under the conditions which stabilize the vanadium in its highest valence state.

Table VII

| Sample | 5351 | 5352 | 5353 | 5354 | 123 | 245 | 799 |
|---|---|---|---|---|---|---|---|
| Analysis: | | | | | | | |
| P.p.m Fe | 2,720 | 2,490 | 2,580 | 2,489 | 2,960 | 2,220 | 1,950 |
| P.p.m. NiO | 343 | 329 | 328 | 322 | 313 | 218 | 110 |
| P.p.m. $V_2O_5$ | 4,695 | 4,664 | 4,603 | 4,132 | 3,691 | 3,317 | 2,766 |

It is claimed:

1. A method for removing nickel from a synthetic gel, silica-based cracking catalyst which has been poisoned by contamination with nickel due to the use of said catalyst in cracking at elevated temperature a hydrocarbon feedstock containing nickel, which comprises bleeding a portion of the nickel-contaminated catalyst from the hydrocarbon cracking system, said bled catalyst being out of contact with the hydrocarbon feedstock, sulfiding said nickel contaminant on the catalyst by contacting bled catalyst at a temperature of about 500 to 1500° F. with a vaporous sulfiding agent, converting sulfided nickel contaminant to a form dispersible in an aqueous medium by contact of the sulfided catalyst with a molecular oxygen-containing gas at a temperature from about room temperature to about 1300° F., washing the catalyst with an aqueous medium consisting essentially of water to remove nickel contaminant, and returning to a hydrocarbon cracking system catalyst reduced in nickel contaminant.

2. The method of claim 1 where the sulfiding is performed by contact with hydrogen sulfide.

Table VI

| Sample | Base | 43 | 45 | 42 | 47 | 46 | 54 | Base | 59 | 58 | 63 |
|---|---|---|---|---|---|---|---|---|---|---|---|
| Oxidation: | | | | | | | | | | | |
| Temp., °F | | 210 | 210 | 210(1) | 210 | 160 | 210 | | 210 | 210 | 210 |
| Gas | | Air | $O_2$ | 40% $O_2$ | Air | $O_2$ | Air | | Air | $O_2$ | $O_2$ |
| $HNO_3$ conc., wt. percent | | 0.25 | 0.25 | 1.0 | .25 | 1.0 | 0.25 | | 0.25 | 0.25 | 0.25 |
| Time, hrs | | 1 | 1 | 1 | 1 | 1 | 1 | | ½ | ¼ | ⅛ |
| Procedure | | A | A | A | A | A | B | | B | B | C |
| P.p.m. NiO | 327 | 200 | 105 | 82 | 111 | 153 | 68 | 328 | 111 | 128 | 122 |
| P.p.m. $V_2O_5$ | 4,240 | 3,779 | 3,296 | 3,089 | 3,111 | 3,700 | 3,059 | 4,320 | 3,463 | 3,480 | 3,454 |
| Percent Fe | 0 270 | 0.239 | 0.184 | 0.175 | .200 | 0.204 | 0.176 | 0.288 | 0.223 | 0.226 | 0.240 |
| Test cracking: | | | | | | | | | | | |
| Relative activity | 35.5 | | 39.0 | 44.2 | 39.9 | 40.0 | 43.1 | 32.3 | 45.2 | 47.4 | 43.3 |
| Distillate + loss | 33.5 | | 35.0 | 37.7 | 35.7 | 35.8 | 37.2 | 31.7 | 38.2 | 39.0 | 37.4 |
| Gas factor | 1.56 | | 1.40 | 1.37 | 1.41 | 1.44 | 1.29 | 1.58 | 1.27 | 1.28 | 1.32 |
| Coke factor | 1.18 | | 1.18 | 1.06 | 1.22 | 1.16 | 1.05 | 1.20 | 1.04 | 1.09 | 1.07 |
| Gas gravity | 1.09 | | 1.20 | 1.22 | 1.20 | 1.19 | 1.23 | 1.07 | 1.27 | 1.27 | 1.23 |

1 40% $O_2$.

EXAMPLE XLIV

Catalyst Samples 5351 and 123 had poisoning histories similar to 5461; their poisoning metals content after regeneration is given in Table VII. Sample 5352 was a portion of 5351 which was slurried in dilute $HNO_3$ and held for one hour at 212° F. while air was bubbled in. Sample 5353 was a portion of 5352 which was thoroughly washed after the treatment and Sample 5354 was a portion of 5353 which was treated with dilute $NH_4OH$ solution. Samples 245 and 799 were portions of Sample 123 which were treated similarly to Sample 5354, except that they were exposed to H₂S for one hour at 1175° F. before the aqueous treatment. In addition, sample 245 prior to sulfiding, had been exposed to air for one hour at 1000° F., a condition ineffective to affect appreciable vanadium. Sample 799 was exposed to air at 1300° F. for one hour before sulfiding. The results show that without sulfiding the aqueous oxidizing medium is ineffective to give metal removal, since the nickel values are constant within analytical limits. The same is true of vanadium except for Sample 5354, the ammonia-treated sample. Also, Samples 245 and 799 show the increase 3. The method of claim 2 where the sufiding is at a temperature about 800 to 1300° F. and a partial pressure of $H_2S$ of about 0.5 to 25 atmospheres.

4. The method of claim 3 where the oxygen-containing gas has an oxygen partial pressure of about 0.1 to 30 atmospheres and a temperature from about room temperature to 1300° F.

5. The method of claim 4 where the catalyst is washed with an acidic aqueous medium.

6. The method of claim 1 wherein the catalyst is silicia-alumina.

7. A method for removing nickel from a synthetic gel, silica-based cracking catalyst which has been poisoned by contamination with nickel due to use of said catalyst in cracking at elevated temperature a hydrocarbon feedstock containing nickel, which comprises bleeding a portion of the nickel-contaminated catalyst from the hydrocarbon cracking system, said bled catalyst being out of contact with the hydrocarbon feedstock, sulfiding said nickel contaminant on the catalyst by contacting bled catalyst with a vaporous sulfiding agent at a temperature of about 500 to 1500° F., converting sulfided nickel contaminant to a form dispersible in an aqueous medium by contact of the sulfided catalyst with a liquid aqueous oxiding medium, washing the catalyst with an aqueous medium consisting essentially of water to remove nickel contaminant, and returning to a cracking system catalyst reduced in nickel contaminant.

8. The method of claim 7 wherein the catalyst is silicia-alumina.

9. The method of claim 8 wherein the sulfiding is performed by contact with hydrogen sulfide at a temperature of about 800 to 1300° F.

10. The method of claim 9 wherein the catalyst is washed with an aqueous acidic medium.

11. The method of claim 7 where the aqueous oxidizing agent is a chlorine solution.

12. The method of claim 7 where the aqueous oxidizing agent is a hydrogen peroxide solution.

13. The method of claim 7 where the aqueous oxidizing agent also contains sulfuric acid.

14. The method of claim 7 wherein the aqueous oxidizing agent is an aerated dilute nitric acid solution.

15. The method of claim 14 wherein the catalyst is silica-alumina.

16. The method of claim 15 wherein the sulfiding is performed by contact with hydrogen sulfide at a temperature of about 800 to 1500° F.

References Cited in the file of this patent
UNITED STATES PATENTS

| | | |
|---|---|---|
| 2,267,736 | Ipatieff et al. | Dec. 30, 1941 |
| 2,772,947 | Sowerwine | Dec. 4, 1956 |
| 3,108,972 | Retailliau | Oct. 29, 1963 |